United States Patent Office 3,449,161
Patented June 10, 1969

3,449,161
FIRE RETARDANT INTUMESCENT COATING
COMPOSITIONS
Raymond R. Hindersinn, Lewiston, and Gilbert Witschard, Grand Island, N.Y., assignors to Hooker Chemical Corporation, Niagara Falls, N.Y., a corporation of New York
No Drawing. Filed Aug. 9, 1965, Ser. No. 478,404
Int. Cl. C09d 5/18
U.S. Cl. 117—136          20 Claims

ABSTRACT OF THE DISCLOSURE

There is provided a fire retardant, intumescent coating composition comprising a halogen-containing coating vehicle and a water-insoluble organo-phosphorus amide of a formula selected from the group consisting of:

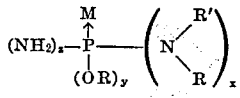

and

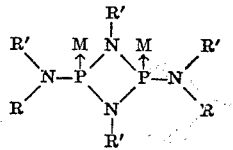

wherein M is selected from the group consisting of oxygen and sulfur, R is selected from the group consisting of aryl and alkyl, R' is selected from the group consisting of hydrogen, aryl and alkyl, $x$ is 1-3, $y$ is 0-2 and $z$ is 0-1, the sum of $x$, $y$ and $z$ being equal to 3.

---

This invention relates to fire retardant coating compositions and more particularly to fire retardant intumescent coatings having improved physical properties such as the retention of fire retardancy qualities after prolonged aqueous leaching and/or scrubbing with soap solutions.

Fire retardant paints and coating compositions have been known for several years. One of the most preferred class of these fire retardant coating compositions is the intumescent type. It has previously been suggested that fire retardancy be incorporated into paint compositions using organo-phosphorus amides prepared by reacting phosphoryl trichloride with dry ammonia to form polymeric materials having a nitrogen-phosphorus atomic ratio in the range of about 1.5:1 to about 2.0:1. While such compositions when used in conjunction with a coating vehicle and a chlorinated organic exhibited the desired intumescent fire retardant properties, such compositions lack the required physical properties of durability and resistance to leaching and degradation of the fire retardant properties on subsequent cleaning of the paint film.

It is an object of the present invention to provide a fire retardant intumescent coating composition having the desired physical properties of aqueous leach resistance and scrubbability. Another object of this invention is to provide coating compositions containing additives that not only impart fire resistance but also enhance or preserve the other physical properties of the coating composition. These and other objects of the invention will become apparent to those skilled in the art from the description which follows.

In accordance with the invention, a fire retardant intumescent paint composition is provided comprising an organic halogenated coating vehicle and a water insoluble organphosphorus amide of a formula selected from the group consisting of:

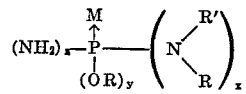

and

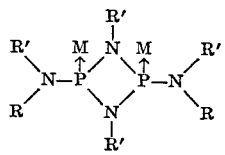

wherein M is selected from the group consisting of oxygen and sulfur, R is selected from the group consisting of aryl and alkyl, R' is selected from the group consisting of hydrogen, aryl and alkyl, $x$ is 1-3, $y$ is 0.2 and $z$ is 0-1, the sum of $x$, $y$ and $z$ being equal to 3.

Compositions of the present invention retain their fire retardant and intumescent properties even after prolonged leaching, scrubbing or washing with water or normal soap and water compositions. Firt retardant properties in the coating compositions have always been a desirable feature but have previously been most difficult to obtain without sacrificing the quality of the coating composition. The present compositions provide the desired fire retardancy while retaining the physical durability of the particular coating composition.

The coating compositions of the present invention can be formulated as paints by the addition of pigments, fillers, and the like, or used as clear varnishes. In many instances, pigmented compositions are more desirable and therefore the description of the invention will be directed more particularly to the pigmented compositions. However, it is to be understood that nonpigmented coating compositions are included within the scope of the invention. Therefore, as used herein, the term "coating composition" means both pigmented and nonpigmented compositions.

The intumescent fire retardant compositions of this invention are comprised of a halogenated organic coating vehicle and an organo-phosphorus amide of defined structure or a nonhalogenated organic coating vehicle, an organic halide, and an organo-phosphorus amide of the structure herein defined. The organic coating vehicle used is preferably an oil based composition such as long, medium or short oil modified alkyd resins, acrylic resins, bodied oils, polyesters, phenolic modified oils, polyvinyl acetates, urethane modified oils, epoxidized oils and the like coating compositions as are well known in the art. The oil modified compositions are normally the reaction products of drying and semi-drying oils such as linseed, soya, safflower, tall, tung, oiticia, perilla, mehaden, anchovy and the like anical, vegetable and fish oils. Occasionally, these coating vehicles are modified with nondrying oils such as coconut, tallow, hydrogenated semi-drying oils and the like. The method of preparing such compositions are well known in the art as well as the many possible modifications and combinations that are normally used in coating compositions.

It is recognized that many of the oil modified resins described can be made water soluble or water dispersible, using various techniques well known in the art. Such water dispersed and water soluble oil modified resins can in most instances be used in the compositions of the present invention.

When the coating vehicle is a halogenated material, such materials are made by reacting a halogenated organic material such as tetrachlorophthalic acid, chlorendic acid, tetrachlorobromobisphenyl-A, tetrabromophthalic acid and anhydride, or the like, with a polyol, carboxylic acid, drying or semi-drying oils and/or additional modifying reactants to produce the coating vehicle. Such compositions are well known in the art.

When the organic coating vehicle used does not contain halogen material reacted therein, then it is preferred to add a halogen-containing organic material to the coating vehicle to form a coating composition in a proportion of about 5 to 30 percent by weight based on the total solids of the composition. Such added organic halides are alkyl, aryl, cycloalkyl and arylalkyl monomeric and polymeric materials comprising about 25 to 80 weight percent halogen based on the weight of the composition. These compounds are polysubstituted with a halogen preferably selected from the group consisting of fluorine, chlorine and bromine, the polysubstitution being in an amount wherein the halogen comprises at least about 25 percent by weight of halogen. Typical halogenated organics useful as additives are chlorinated bisphenols, chlorinated paraffins, chlorinated pentacyclo materials such as hexachlorocyclopentadiene, the reaction product of hexachlorocyclopentadiene and cis polybutadiene, pentachloropentacyclo(5.2.1.0$^{2,6}$.0$^{3,9}$.0$^{5,8}$)decane, 1,4,7,10 - dimethanocycloocta - 1,2,3,4,7,8, 9,10,13,13,14,14 - dodecachloro - 1,4,4a,5,6,6a,7,10,10a, 11,12,12a - dodecahydro(1,2,5,6)dibenzene and similar polyhalogenated materials. Numerous other chlorinated organics of the type described are known in the art. It is preferred that the halogenated organics used contain more than about 25 percent by weight of halogen and more preferable wherein the halogen is chlorine and/or bromine and the halogen is in an amount of more than about 30 up to about 70 percent of the organic.

Thus in the coating compositions of the present invention, an organic coating vehicle, preferably a halogenated organic coating vehicle, is used in an amount of about 20 to 60 percent based on the nonvolatile content of the coating composition, and wherein an organic halide is used as a nonreacted additive, it is used in an amount of about 5 to about 30 percent based on the nonvolatile content of the total coating composition, in addition to about 5 to 30 percent water insoluble organo-phosphorus amide.

The water insoluble organo-phosphorus amide used in the present invention is of the structural formula:

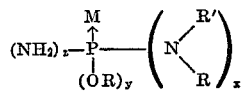

and

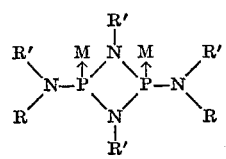

wherein M is selected from the group consisting of oxygen and sulfur, R is selected from the group consisting of aryl and alkyl, R' is selected from the group consisting of hydrogen, aryl and alkyl, $x$ is 1–3, $y$ is 0–2 and $z$ is 0–1, the sum of $x$, $y$ and $z$ being equal to 3. The aryl groups which can be substituted for R and R' are preferably of 6 to 20 carbon atoms and more preferably are substituted or nonsubstituted phenyl groups, the substituents if any being alkyl and/or halogen. The alkyl groups of R and R' are preferably of 1 to 12 carbon atoms and more preferably are halogenated or nonsubstituted alkyl of 1 to 6 carbon atoms. Thus, the more preferred alkyl groups include methyl, ethyl, propyl, butyl, amyl and hexyl groups which may have halogen substituents.

Compounds included within the organo-phosphorus amides of this invention are:

Thiophosphoryltrianilide
Dimeric thiophosphoric anil anilide
Dimeric phosphoric anil imide
Diphenylphosphoramidate
Triethyltriamidothionophosphates
Diphenylphosphorylamidate

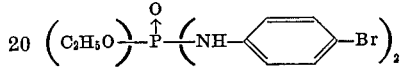

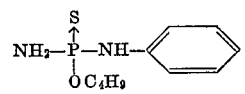

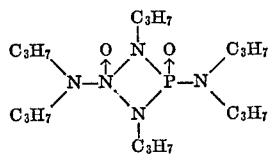

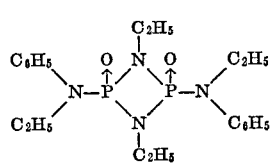

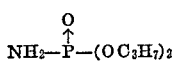

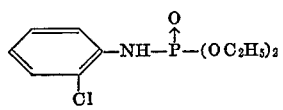

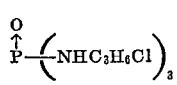

The most preferred compound is phosphoryltrianilide (PTA) having the structure:

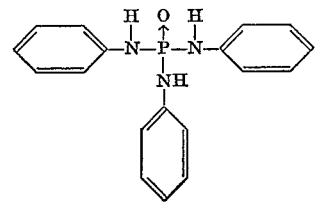

and dimeric phosphoric anil anilide (DIP)

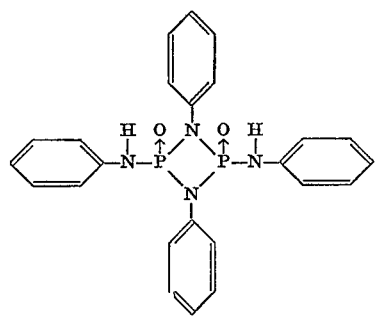

The described organo-phosphorus amide is used in the coating compositions of the present invention by adding about 5 to 30 percent amide based on the nonvolatile content of the total coating composition. When used in a formulation, the organo-phosphorus amide may be added as a solid crystalline material or it may be dissolved in a suitable organic solvent prior to its addition to the coating formulation.

While not essential, spumifics and carbonifics may also be added to the coating composition to improve the intumescent characteristics. When spumifics are used, they are preferably of lesser water solubility such as dicyandiamide, melamine and the like. Normally, an addition of about 5 to 15 percent based on the total nonvolatile content of the composition is used.

In a like manner, carbonifics may also be incorporated in an amount of about 5 to 15 percent based on the nonvolatile content of the total coating composition. The carbonifics used are preferably of the nonresinous, low water solubility type such as pentaerythritol, tripentaerythritol, and the like.

In most coating compositions prepared in the manner described herein, it is desirable to incorporate pigments into the compositions to produce paints. In such instances, conventional inert pigments, fillers, coloring agents and the like are used, the pigments, etc., normally comprising about 10 to 50 percent by weight of the nonvolatiles in the total composition. Also, fire retardant pigments can be used as a partial replacement for the inert pigments or fillers. The pigments are incorporated into the coating composition by conventional means such as by grinding, milling and the like.

Various other ingredients normally incorporated into paint compositions can be used without impairing the fire retardant and intumescent properties of the coating compositions described. Therefore, fillers such as diatomaceous earth, calcium carbonate and the like can be used as is conventional in the art. Also, leveling agents and spreading aids such as silicone resins are normally used. Also, driers such as cobalt, naphthenate, lead naphthenate, zinc naphthenate, the respective tallates and the like organo metallic driers are used.

Suitable compatible solvents are also employed to reduce the nonvolatile content of the coating composition and adjust the viscosity to the preferred application consistency. Also, anti-skinning agents are usually employed as is the normal practice.

The fire retardant intumescent coating compositions of the present invention are suitable for numerous applications such as in the construction of homes, the painting of plastics, metals home furnishings such as wall panels, molding, trim boards, furniture, siding such as clapboard, shakes and the like, shingles, and various other cellulosic structures. The fire retardant intumescent coating compositions of the present invention are particularly advantageous for use in areas where the need for periodic cleaning is often encountered such as wall panels, walls, trim boards, door casings and the like, or wherein rain and weather is likely to repeatedly contact the painted surface such as in siding and shingles. The resistance to leaching and low sensitivity to soap scrubbing makes the present compositions highly desirable compared with previously used fire retardant intumescent paints.

The following examples illustrate certain preferred embodiments of the present invention. Unless otherwise indicated, all parts and percentages used herein are by weight and all temperatures in the examples and claims are in degrees centigrade unless otherwise indicated.

EXAMPLES 1 THROUGH 8

To following examples illustrate a series of eight paint compositions formulated in accordance with the present invention compared with three commercially available fire retardant intumescent paints. The eight paint compositions of this invention are further compared with control paint formulations using the same coating vehicles but without the organo-phosphorus amides of the present invention.

The paints in these examples were prepared in a conventional manner using a suitable paint mill. The milling was accomplished by mixing sufficient coating vehicle with the entire pigment portion and drier system to make a paste of the correct consistency for grinding. After forming the paste, the compositions were ground and thinned to the desired viscosity by adding solvent and the remainder of the ingredients.

The paints were applied to ¼ by 8 by 12 inch yellow poplar panels by brushing. Two coats were applied to each test panel, obtaining as uniform coverage as possible. Backs, edges and sides were also well coated with the same material. A drying period of approximately one week at room temperature was allowed between coats while an additional period of two weeks was allowed after the second coat. Prior to the burning test, the panels were placed in an oven at about 120 degrees Fahrenheit for a period of 40 hours.

The flame tests were carried out on the test panels using the methods specified in American Society for Testing Materials Procedure D-1360-58, "Fire Retardancy of Paints," method C. Testing was performed within a sheet metal enclosure having inside dimensions of 12 by 12 by 30 inches in height. The device was fitted with a smoke stack on the top. The enclosure had a viewing window on one side of sufficient size and in such a position that specimens under tests could be observed. This viewing side was hinged so that the enclosure could be readily opened and closed to facilitate the conduction of the ignition tests within the enclosure. The test specimens were mounted on a suitable support with the test face angled downward at a 45 degree angle with the vertical. The flame source was absolute ethyl alcohol contained in a brass cup supported on a cork insulated metal pedestal so positioned that the vertical distance from the cup-lip nearest the panel base was exactly one inch. The cup was set to be equal distance from the panel sides. The cup had an outside diameter of $5/16$ inch with an outside height of $5/16$ inch and a volume of 6 milliliters. Prior to testing, each panel was weighed to the nearest $1/10$ gram. Using a pipette, 5 milliliters of alcohol was added to the cup and ignited without delay by means of a Bunsen burner. The test was allowed to continue until all the flames were self-extinguished. The test panels were then allowed to cool at room temperature. The weight losses were then determined. The char areas were measured and char volume was determined by measuring the depth of the char as evidenced by longitudinal and lateral cuts, and multiplying this by the char area. The procedure was then repeated on at least four replicate panels.

In addition to the flame tests, at least four replicate panels of the formulations were leached in water for 24 hours at 50 degrees centigrate in the manner described in Federal Specifications TT-P-0026B. These test panels were dried and subsequently tested for fire retardancy in the same manner as the panels which were not leached. The results of the burning tests for both the leached and the nonleached panels are shown in Table I.

In addition to the leaching test described, paint compositions prepared in accordance with the present invention were also tested for serviceability in the manner described by the National Paint, Varnish and Lacquer Association. In this test, the paints were applied to ground glass plates and, after suitable aging as described for the flammability tests, the paint films were subjected to 1000 cycles which equal 2000 strokes of a one pound brush saturated with a 0.5 percent soap solution (Ivory Flakes). Any break showing in the film on the completion of the 1000 cycles is sufficient to fail the test. All of the paint composition of this invention as illustrated in Examples 1 through 8 readily passed this test.

In Table I, the numbered examples comprise the following paint formulations:

EXAMPLE 1.—PAINT FORMULATION A

| Ingredients | Parts by Weight |
|---|---|
| Pigments: | |
|     TiO₂, rutile | 114.6 |
|     Titanium-calcium pigment (30–70%) | 30.9 |
|     Zinc oxide | 28.7 |
| Fillers: | |
|     Diatomaceous earth | 20.1 |
|     Calcium carbonate | 8.6 |
| Halogenated Organic 1,4,7,10-dimethanocycloocta-1,2,3,4,7,8, 9,10,13,13,14,14-dodecachloro-1,4,4a,5,6,6a,7,10,10a,11,12,12a-dodecahydro(1,2,5,6)dibenzene | 280.2 |
| Organo-Phosphorus Amide, Phosphoryl trianilide | 90.0 |
| Coating Vehicle, Soya modified phthalic alkyl (50% nonvolatiles) | 571.3 |
| Flow Agent, Silicone resin (60% nonvolatiles) | 10.0 |
| Driers: | |
|     Cobalt naphthenate 6% | 1.4 |
|     Lead naphthenate 24% | 5.7 |
| Solvent, Mineral spirits | 145.0 |
| Anti-skinning Agent | 0.15 |

EXAMPLE 2.—PAINT FORMULATION B

| Ingredients | Parts by Weight |
|---|---|
| Pigments: | |
|     TiO₂, rutile | 114.6 |
|     Titanium-calcium pigment (30–70%) | 30.9 |
|     Zinc oxide | 28.7 |
| Fillers: | |
|     Diatomaceous earth | 20.1 |
|     Calcium carbonate | 8.6 |
| Organic Halide, 1,4,7,10-dimethanocycloocta-1,2,3,4,7,8,9,10, 13,13,14,14-dodecachloro-1,4,4a,5,6,6a,7,10,10a,11,12,12a-dodecahydro(1,2,5,6)dibenzene | 90.0 |
| Organo-Phosphorus Amide, Phosphoryl trianilide | 280.2 |
| Coating Vehicle, Soya modified phthalic alkyd (50% N.V.) | 571.3 |
| Flow Agent, Silicone resin (60% N.V.) | 10.0 |
| Driers: | |
|     Cobalt naphthenate 6% | 1.4 |
|     Lead naphthenate 24% | 5.7 |
| Solvent, Mineral spirits | 146.0 |
| Anti-skinning Agent | 0.15 |

EXAMPLE 3.—PAINT FORMULATION C

| Ingredients | Parts by Weight |
|---|---|
| Pigments: | |
|     TiO₂, rutile | 114.6 |
|     Titanium-calcium pigment (30–70%) | 30.9 |
|     Zinc oxide | 28.7 |
| Fillers: | |
|     Diatomaceous earth | 20.1 |
|     Calcium carbonate | 8.6 |
| Organic Halide, Chlorinated biphenyl (68% chlorine) | 185.2 |
| Organo-Phosphorus Amide, Phosphoryl trianilide | 185.2 |
| Coating Vehicle, Soay modified phthalic alkyl (50% N.V.) | 571.3 |
| Flow Agent, Silicone resin (60% N.V.) | 10.0 |
| Driers: | |
|     Cobalt naphthenate 6% | 1.4 |
|     Lead naphthenate 24% | 5.7 |
| Solvent, Mineral spirits | 108 |
| Anti-skinning Agent | 0.15 |

EXAMPLE 4.—PAINT FORMULATION D

| Ingredients | Parts by Weight |
|---|---|
| Pigments: | |
|     TiO₂, rutile | 114.6 |
|     Titanium-calcium pigment (30–70%) | 30.9 |
|     Zinc oxide | 28.7 |
| Fillers: | |
|     Diatomaceous earth | 20.1 |
|     Calcium carbonate | 8.6 |
| Organic Halide, Chlorinated paraffin (70% Cl) | 185.2 |
| Organo-Phosphorus Amide, Phosphoryl trianilide | 185.0 |
| Coating Vehicle, Soya modified phthalic alkyl (50% N.V.) | 571.3 |
| Flow Agent, Silicone resin (60% N.V.) | 10.0 |
| Driers: | |
|     Cobalt naphthenate 6% | 1.4 |
|     Lead naphthenate 24% | 5.7 |
| Solvent, Mineral spirits | 154 |
| Anti-skinning Agent | 0.15 |

EXAMPLE 5.—PAINT FORMULATION E

| Ingredients | Parts by Weight |
|---|---|
| Pigment, Titanium-calcium pigment (30–70%) | 302.0 |
| Fillers: | |
|     Diatomaceous earth | 86.0 |
|     Calcium carbonate | 86.0 |
| Organo-Phosphorus Amide, Phosphoryl trianilide | 90.0 |
| Carbonifics, Tripentaerythritol | 45.0 |
| Spumifics, Melamine | 135.0 |
| Halogenated Coating Vehicle, Chlorinated alkyd (60% N.V.) meeting Military specification MIL-R-2147 (Ships) | 476.2 |
| Driers: | |
|     Cobalt naphthenate 6% | 10.0 |
|     Lead naphthenate 24% | 3.4 |
| Solvent, Mineral spirits | 122.9 |

EXAMPLE 6.—PAINT FORMULATION F

| Ingredients | Parts by Weight |
|---|---|
| Pigment, Titanium-calcium pigment (30–70%) | 212.0 |
| Fillers: | |
|     Calcium carbonate | 20.0 |
|     Diatomaceous earth | 20.0 |
| Organo-Phosphorus Amide, Dimeric phosphoric anil anilide | 90.0 |
| Spumifics, Dicyandiamide | 90.0 |
| Carbonifics, Tripentaerythritol | 90.0 |
| Halogenated Coating Vehicle: | |
|     Chlorinated alkyd (60% N.V.) meeting Military specification MIL-R-2147 (Ships). | 476.2 |
| Flow Agent, Silicone resin (60% N.V.) | 10.0 |
| Driers: | |
|     Cobalt naphthenate 6% | 3.4 |
|     Lead naphthenate 24% | 10.0 |
| Solvent, Mineral spirits | 110.0 |

EXAMPLE 7.—PAINT FORMULATION G

| Ingredients | Parts by Weight |
|---|---|
| Pigments: | |
|     TiO₂, rutile | 114.6 |
|     Titanium-calcium pigment (30–70%) | 301.9 |
|     Zinc oxide | 28.7 |
| Fillers: | |
|     Diatomaceous earth | 20.1 |
|     Calcium carbonate | 8.6 |
| Organo-Phosphorus Amide, Phosphoryl trianilide | 90.0 |
| Halogenated Coating Vehicle, Chlorinated alkyd (60% N.V.) meeting Military specification MIL-R-2147 (Ships) | 476.2 |
| Flow Agent Silicone resin (60% N.V.) | 10.0 |
| Driers: | |
|     Cobalt naphthenate 6% | 1.4 |
|     Lead naphthenate 24% | 5.7 |
| Solvent, Mineral sgirits | 80.0 |
| Anti-skinning Agent | 0.15 |

EXAMPLE 8.—PAINT FORMULATION H

| Ingredients | Parts by Weight |
|---|---|
| Pigment, Titanium-calcium gigment (30–70%) | 301.9 |
| Fillers: | |
|     Calcium carbonate | 86.0 |
|     Diatomaceous earth | 86.0 |
| Organo-Phosphorus Amide, Phosphoryl trianilide | 90.0 |
| Halogenated Coating Vehicle, Chlorinated alkyd (60% N.V.) meeting Military specification MIL-R-2147 (Ships) | 476.2 |
| Driers: | |
|     Cobalt naphthenate 6% | 4.2 |
|     Lead naphthenate 24% | 11.0 |
| Solvent, Mineral spirits | 110.0 |
| Anti-skinning Agent | 0.15 |

CONTROL #1

| Ingredients | Parts by Weight |
|---|---|
| Pigments: | |
|     TiO₂, rutile | 122.8 |
|     Titanium-calcium pigment (30–70%) | 368.8 |
|     Zinc oxide | 30.7 |
| Fillers: | |
|     Diatomaceous earth | 21.5 |
|     Calcium carbonate | 70.6 |
| Coating Vehicle, Soya modified phthalic alkyd (50% N.V.) | 612.2 |
| Driers: | |
|     Cobalt naphthenate 6% | 1.54 |
|     Lead naphthenate 24% | 6.14 |
| Solvent, Mineral spirits | 227 |

CONTROL #2

| Ingredients | Parts by Weight |
| --- | --- |
| Pigments: | |
|     TiO₂, rutile | 122.8 |
|     Titanium-calcium pigment (30–70%) | 368.8 |
|     Zinc oxide | 30.7 |
| Fillers: | |
|     Diatomaceous earth | 21.5 |
|     Calcium carbonate | 70.6 |
| Halogenated Coating Vehicle, Chlorinated alkyd (60% N.V.) meeting military specification MIL-R-2147 (Ships) | 510.0 |
| Driers: | |
|     Cobalt napthenate 6% | 1.54 |
|     Lead naphthenate 24% | 6.14 |
| Solvent, Mineral spirits | 230 |

In Examples 5, 6, 7, 8 and Control #2, the chlorinated alkyd was a commercially available alkyd resin produced by the reaction of chlorendic acid, phthalic anhydride, soya acids and glycerol.

Table I shows the results obtained, the figures being the average of at least four panels.

TABLE I

| | | ASTM D 1360–58 Cabinet Flame Test | | | |
| --- | --- | --- | --- | --- | --- |
| | Film Thickness, mils | Weight-Loss (grams) | Intumescence (inches) | Char Area (square inches) | Char Volume (cubic inches) |
| Example Number: | | | | | |
| Control #1 | 10 | 17.5 | None | 37.63 | 5.30 |
| Example 1 | 11 | 7.7 | 0.63 | 10.43 | 0.96 |
| Example 1 after 24 hour leach | 11 | 6.9 | 0.73 | 9.40 | 0.82 |
| Example 2 | 10 | 6.5 | 0.92 | 17.90 | 2.21 |
| Example 3 | 10 | 9.9 | 0.61 | 18.65 | 2.53 |
| Example 4 | 10 | 5.5 | 0.83 | 13.12 | 1.19 |
| Control #2 | 10 | 12.5 | None | 24.81 | 4.86 |
| Example 5 | 10 | 9.9 | 0.48 | 14.40 | 2.39 |
| Example 5 after 24 hour leach | 10 | 8.9 | 0.43 | 11.88 | 2.04 |
| Example 6 | 10 | 9.4 | 0.83 | 18.49 | 2.67 |
| Example 7(a) | 6.5 | 5.1 | 0.89 | 12.64 | 1.44 |
| Example 7 after 24 hour leach | 6.5 | 6.6 | 0.54 | 12.09 | 2.01 |
| Example 7(b) | 8.5 | 5.1 | 1.03 | 11.03 | 0.81 |
| Example 7(c) | 11 | 4.9 | 1.27 | 16.40 | 0.98 |
| Example 8(a) | 7 | 7.3 | 0.57 | 21.18 | 3.39 |
| Example 8(b) | 10 | 6.6 | 0.70 | 17.82 | 2.48 |
| Commercial #1 | 9.2 | 10.6 | None | 27.31 | 5.99 |
| Commercial #1 after 24 hour leach | 9.2 | 7.6 | None | 24.15 | 5.32 |
| Commercial #2 | 10 | 2.0 | 0.53 | 11.19 | 0.53 |
| Commercial #2 after 24 hour leach | 10 | 21.2 | None | 49.86 | 10.47 |
| Commercial #3 | 14.7 | 3.5 | 0.91 | 3.50 | 0.13 |
| Commercial #3 after 24 hour leach | 14.7 | 24.8 | None | 46.02 | 10.00 |

The commercial paints illustrated in Table I were as follows:

Commercial #1 was a fire retardant paint of the soya alkyd type containing 10 percent antimony oxide based on the nonvolatile content.

Commercial #2 was a fire retardant paint containing an organo-phosphate fire retardant.

Commercial #3 was a latex paint containing monoammonium phosphate, dicyaniamide, pentaerythritol and starch.

A comparative analysis between the control examples and the examples of this invention illustrate the pronounced fire retardant effect produced by incorporating the organo-phosphorus amides of the present invention into the paint composition. Comparing the commercial paint composition with the examples of the present invention illustrates the pronounced effect of fire retardant characteristics and intumescence properties both prior to leaching and after leaching. The commercial products tested tended to lose their fire retardance characteristics after leaching with water.

In a like manner, other organo-phosphorus amides of the structure of the present invention can be used in place of those specifically illustrated in the examples. When these other organo-phosphorus amides as described herein are used in coating compositions as illustrated in the examples, correspondingly good results are obtained.

While there have been described various embodiments of the invention, the methods described are not intended to be understood as limiting the scope of the invention, as it is realized that changes therein are possible. It is further intended that each element recited in any of the following claims is to be understood as referring to all equivalent elements for accomplishing substantially the same results in substantially the same or equivalent manner. It is intended to cover the invention broadly in whatever form its principles may be utilized.

What is claimed is:

1. A fire retardant intumescent coating composition consisting essentially of a halogen-containing organic vehicle and about 5 to 30 weight percent based on the nonvolatile content of the total coating composition of a water insoluble organo-phosphorus amide of a formula selected from the group consisting of:

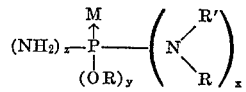

and

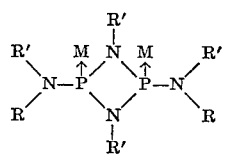

wherein M is selected from the group consisting of oxygen and sulfur, R is selected from the group consisting of aryl and alkyl, R' is selected from the group consisting of hydrogen, aryl and alkyl, x is 1–3, y is 0–2 and z is 0–1, the sum of x, y and z being equal to 3, wherein the halogen in the halogen-containing organic vehicle is selected from the group consisting of chlorine, bromine and mixtures thereof.

2. The fire retardant intumescent coating composition of claim 1 wherein the organo-phosphorus amide is phosphoryl trianilide.

3. The fire retardant intumescent coating composition of claim 1 wherein the organo-phosphorus amide is dimeric phosphoric anil anilide.

4. The fire retardant intumescent coating composition of claim 1 wherein the halogen of the halogen-containing organic coating vehicle is chlorine.

5. A fire retardant intumescent coating composition consisting essentially of a halogen-containing organic coating vehicle and a water insoluble oragno-phosphorus amide selected from the group consisting of phosphoryl trianilide and dimeric phosphoric anil anilide, wherein the halogen in the halogen-containing organic coating vehicle is selected from the group consisting of chlorine, bromine and mixtures thereof.

6. A fire retardant intumescent coating composition consisting essentially of a halogen-containing organic coating vehicle and about 5 to 30 weight percent based on the nonvolatile content of the total coating compositions of a water insoluble organo-phosphorus amide of a formula selected from the group consisting of:

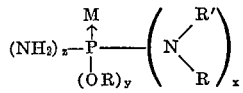

and

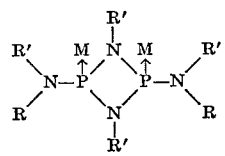

wherein M is selected from the group consisting of oxygen and sulfur, R is selected from the group consisting of substituted and nonsubstituted aryl of 6 to 20 carbon atoms and substituted and nonsubstituted alkyl of 1 to 12 carbon atoms, R' is selected from the group consisting of hydrogen, substituted and nonsubstituted aryl of 6 to 20 carbon atoms and substituted and nonsubstituted alkyl of 1 to 12 carbon atoms, $x$ is 1–3, $y$ is 0–2 and $z$ is 0–1, the sum of $x$, $y$ and $z$ being equal to 3, wherein the halogen in the halogen-containing organic coating vehicle is selected from the group consisting of chlorine, bromine and mixtures thereof.

7. The fire retardant intumecent coating composition of claim 6 wherein the coating composition contains pigments.

8. The fire retardant intumescent coating composition of claim 6 wherein the coating composition contains water insoluble spumifics selected from the group consisting of melamine and dicyandiamide.

9. The fire retardant intumescent coating composition of claim 6 wherein the coating composition contains tripentaerythritol.

10. The fire retardant intumescent coating composition of claim 6 wherein the coating composition contains about 5 to 30 percent based on the total nonvolatile content of the composition of an organic halide, said halide comprising about 25 to 80 percent by weight of the organic halide, wherein the halogen of said organic halide is selected from the group consisting of fluorine, chlorine and bromine.

11. The fire retardant intumescent coating composition consisting essentially of an organic coating vehicle, an organic halide containing 25 to 80 weight percent halogen and about 5 to 30 weight percent based on the nonvolatile content of the total coating composition of a water insoluble organo-phosphorus amide of a formula selected from the group consisting of:

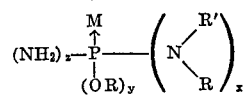

and

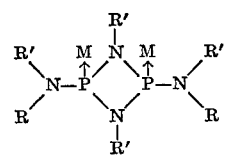

wherein M is selected from the group consisting of oxygen and sulfur, R is selected from the group consisting of substituted and nonsubstituted aryl of 6 to 20 carbon atoms and substituted and nonsubstituted alkyl of 1 to 12 carbon atoms, R' is selected from the group consisting of hydrogen, substituted and nonsubstituted aryl of 6 to 10 carbon atoms and substituted and nonsubstituted alkyl of 1 to 12 carbon atoms, $x$ is 1–3, $y$ is 0–2 and $z$ is 0–1, the sum of $x$, $y$ and $z$ being equal to 3, wherein the halogen in said organic halide is selected from the group consisting of fluorine, chlorine and bromine, and wherein said organic coating vehicle is selected from the group consisting of oil modified alkyd resins, acrylic resins, bodied oils, polyesters, phenolic modified oils, polyvinyl acetates, urethane modified oils and epoxidized oils.

12. A fire retardant intumescent paint composition consisting essentially of on the nonvolatile weight basis 20 to 50 percent halogen-containing organic coating vehicle, 5 to 30 percent of an organo-phosphorus amide selected from the group consisting of phosphoryl trianilide and dimeric phosphoric anil anilide, 10 to 15 percent pigments and organic solvent, wherein the halogen of said halogen-containing organic coating vehicle is selected from the group consisting of chlorine and bromine and mixtures thereof.

13. A fire retardant intumescent coating composition consisting essentially of on a nonvolatile basis, 20 to 50 percent organic coating vehicle, 5 to 30 percent organic halide containing 25 to 80 weight percent halogen, 5 to 30 percent organo-phosphorus amide selected from the group consisting of phosphoryl trianilide and dimeric phosphoric anil anilide, wherein the halogen in said organic halide is selected from the group consisting of fluorine, chlorine, and bromine, and wherein said organic coating vehicle is selected from the group consisting of oil modified alkyd resins, acrylic resins, bodied oils, polyesters, phenolic modified oils, polyvinyl acetates, urethane modified oils, and epoxidized oils.

14. A fire retardant article comprised of an article having a surface coated with a coating composition consisting essentially of a halogen-containing organic coating vehicle and about 5 to 30 weight percent based on the nonvolatile content of the total coating composition of a water insoluble organo-phosphorus amide of a formula selected from the group consisting of:

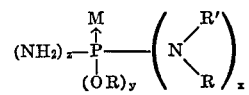

and

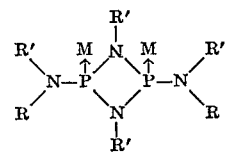

wherein M is selected from the group consisting of oxygen and sulfur, R is selected from the group consisting of substituted and nonsubstituted aryl of 6 to 20 carbon atoms and substituted and nonsubstituted alkyl of 1 to 12 carbon atoms, R' is selected from the group consisting of hydrogen, substituted and nonsusbtituted aryl of 6 to 10 carbon atoms and substituted and nonsubstituted alkyl of 1 to 12 carbon atoms, $x$ is 1–3, $y$ is 0–2 and $z$ is 0–1, the sum of $x$, $y$ and $z$ being equal to 3, wherein the halogen of the halogen-containing organic coating vehicle is selected from the group consisting of chlorine, bromine and mixtures thereof.

15. The fire retardant article of claim 14 wherein the organo-phosphorus amide is phosphoryl trianilide.

16. The fire retardant article of claim 14 wherein the organo-phosphorus amide is dimeric phosphoric anil anilide.

17. A fire retardant article comprised of an article having a surface coated with a coating composition consisting essentially of an organic halide containing 25 to 80 weight percent halogen, an organic coating vehicle and about 5 to 30 weight percent based on the nonvolatile content of the total coating composition of an organo-phosphorus amide of a formula selected from the group consisting of:

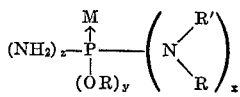

and

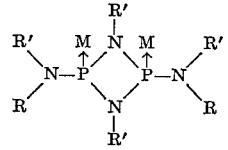

wherein M is selected from the group consisting of oxygen and sulfur, R is selected from the group consisting of substituted and nonsubstituted aryl of 6 to 20 carbon atoms and substituted and nonsubstituted alkyl of 1 to 12 carbon atoms, R' is selected from the group consisting of hydrogen, substituted and nonsubstituted aryl of 6 to 20 carbon atoms and substituted and nonsubstituted alkyl of 1 to 12 carbon atoms, $x$ is 1–3, $y$ is 0–2 and $z$ is 0–1, the sum of $x$, $y$ and $z$ being equal to 3, wherein the halogen in said organic halide is selected from the group consisting of fluorine, chlorine and bromine, and wherein said organic coating vehicle is selected from the group consisting of oil modified alkyd resins, acrylic resins, bodied oils, polyesters, phenolic modified oils, polyvinyl acetates, urethane modified oils and epoxidized oils.

18. The fire retardant article of claim 17 wherein the organo-phosphorus amide is phosphoryl trianilide.

19. The fire retardant article of claim 17 wherein the organo-phosphorus amide is dimeric phosphoric anil anilide.

20. A method for applying an intumescent coating composition comprising applying a coating composition consisting essentially of a halogen-containing organic coating vehicle and an organo-phosphorus amide selected from the group consisting of phosphoryl trianilide and dimeric phosphoric anil anilide, wherein the halogen of said halogen-containing organic coating vehicle is selected from the group consisting of chlorine, bromine and mixtures thereof, to a cellulosic substrate, using 1 to about 8 separate applications, and curing said coating composition after each successive application of said coating composition, said applications being in an amount to produce a cured coating of about 3 to 12 mils.

References Cited
UNITED STATES PATENTS

| | | | |
|---|---|---|---|
| 2,582,181 | 1/1952 | Truhlar et al. | 117—137 X |
| 3,127,445 | 3/1964 | Binder et al. | 252—8.1 X |
| 3,284,216 | 11/1966 | Kaplan | 117—137 X |
| 3,312,565 | 4/1967 | Rayner et al. | 117—137 X |
| 3,314,899 | 4/1967 | Parts et al. | 260—551 X |

WILLIAM D. MARTIN, *Primary Examiner.*

H. J. GRINNELL, *Assistant Examiner.*

U.S. Cl. X.R.

106—15; 117—132, 137, 148; 252—8.1; 260—18, 19, 22, 23, 23.7, 29.2, 29.3, 29.6, 33.6, 37, 38, 40, 41, 41.5, 45.7, 45.9, 45.95, 75, 85.7 86.1, 824, 826, 827, 873, 886, 890

PO-1050
(5/69)

UNITED STATES PATENT OFFICE
CERTIFICATE OF CORRECTION

Patent No. 3,449,161    Dated   June 10, 1969

Inventor(s)  Raymond R. Hindersinn et al.

It is certified that error appears in the above-identified patent and that said Letters Patent are hereby corrected as shown below:

Column 2, line 7, for "organphosphorus" read --organophosphorus--; column 2, line 24, for "0.2" read -- 0-2 --; column 2, line 29, for "Firt" read --Fire--; column 2, line 60, for "mehaden" read --menhaden--; column 2, line 61, for "anical" read --animal--. Column 4, line 28, the left hand portion of the formula should appear as follows

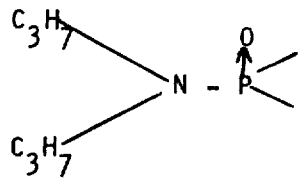

Column 5, line 72, for "To" read --The--. Column 6, line 56, for "centigrate" read --centigrade--. Column 7, line 53, for "Soay" read --Soya--. Column 8, line 44, for "sgirits" read --spirits--; column 8, line 53, for "gigment" read --pigment--; column 8, line 57, for "specificatlon" read --specification--; column 8, line 72, for "Coating" read --Coating--. Column 9, line 12, for "sgirits" read --spirits--; column 9, line 51, for "dicyaniamide" read --dicyandiamide--. Column 10, line 70, for "oragno" read --organo--. Column 12, line 12, for "10 to 15" read -- 10 to 50 --; and column 12, line 59, for "nonsusbtitute read --nonsubstituted--.

SIGNED AND
SEALED
AUG 23 1970

(SEAL)
Attest:

Edward M. Fletcher, Jr.
Attesting Officer

WILLIAM E. SCHUYLER, JR.
Commissioner of Patents